United States Patent [19]

Levasseur

[11] 4,280,181

[45] Jul. 21, 1981

[54] CASH ACCOUNTABILITY CONTROL CIRCUIT FOR VENDING AND LIKE MACHINES

[75] Inventor: Joseph L. Levasseur, Chesterfield, Mo.

[73] Assignee: H. R. Electronics Company, St. Louis, Mo.

[21] Appl. No.: 94,576

[22] Filed: Nov. 15, 1979

Related U.S. Application Data

[63] Continuation of Ser. No. 688,384, May 20, 1976, abandoned.

[51] Int. Cl.³ .................... G06F 15/21; G06F 7/50
[52] U.S. Cl. .................................. 364/464; 194/1 N; 235/92 AC; 364/479
[58] Field of Search .................. 364/464, 479, 768; 235/92 AC, 92 SA; 194/1 N, 10, ; 221/2; 222/23, 30, 36, 37

[56] References Cited

U.S. PATENT DOCUMENTS

| 3,638,003 | 1/1972 | Meixner | 364/401 |
|---|---|---|---|
| 3,710,085 | 1/1973 | Brewer et al. | 364/404 |
| 3,815,718 | 6/1974 | Singer | 194/1 N |
| 3,894,220 | 7/1975 | Levasseur | 194/1 N X |
| 4,003,030 | 1/1977 | Takagi et al. | 235/92 AC X |

Primary Examiner—Jerry Smith
Attorney, Agent, or Firm—Charles B. Haverstock

[57] ABSTRACT

A control circuit for vending and other coin controlled devices including a first accumulator for accumulating the price of each vend, said accumulator having a first input where signals that represent each vend price are entered, a second input where signals for initiating a vend operation are entered, a third accumulator input, and an accumulator output, a pulse generator having an input connected to the third accumulator output, said pulse generator having an output operatively connected to the third accumulator input, said pulse generator producing outputs to enter into the accumulator whenever a vend operation is initiated and until the amount entered into the first accumulator equals the vend price also entered therein, a second accumulator having an input operatively connected to the output of the pulse generator and including means to accumulate the total of all vend prices entered in the first accumulator, and a readout device associated with the second accumulator where the running total being accumulated in the second accumulator is indicated. The present control circuit may optionally include a reset control to periodically reset the second accumulator so that total net sales over any desired time period can be accumulated. The subject circuit can also include various types of accumulators including multi-stage binary circuits, adder circuits, shift registers, and ring counters to mention a few.

6 Claims, 2 Drawing Figures

CASH ACCOUNTABILITY CONTROL CIRCUIT FOR VENDING AND LIKE MACHINES

This is a continuation of copending Levasseur U.S. application Ser. No. 688,384 filed May 20, 1976, and entitled Cash Accountability Control Circuit For Vending And Like Machines and now abandoned.

Many vend control circuits are in existence and some are covered by patents and patent applications. For the most part, the known circuits are directed to features such as to the means for entering amounts deposited; the means that control and cause a vend operation to take place; the change or refund means, when necessary; multi-price features; and other features; most of which relate to pricing, refunding and escrowing, accumulating, and related vending functions. Some of the known circuits also provide for vend selection and/or counter reset; some reduce the amounts deposited and entered to reflect paybacks made, which paybacks can occur before or after the vend takes place; and some of the known control circuits can perform other functions as well. Known circuits are also constructed of solid state components, including integrated circuit elements and other types of circuitry and elements as well. Control circuits representative of the prior art are disclosed in U.S. Pat. Nos. 3,307,671; 3,508,636; 3,687,255; 3,820,642; 3,828,903; 3,841,456; 3,894,220; 4,008,792; and 4,034,839, all assigned to Applicant's assignee.

The present circuit can be incorporated for use with many known circuits, and when this is done it offers further advantages and versatility to vend control circuits by providing, in addition to the usual controls relating to vending operation, the added feature of cash accountability. This feature makes it possible to keep track of total net sales from one or more vending machines on a continuing basis or over fixed or variable time periods, and the present circuit makes it possible to obtain ongoing sales information. It also provides a check on the honesty and efficiency of route salesmen who service vending machines. Furthermore, with the present circuit a supervisor can quickly and accurately ascertain total net sales at any given time so that this information can be used to provide up-to-date sales information and sales information that can be compared with the sales information turned in by route servicemen. So far as known, it has not heretofore been possible nor have any means been devised that produce this information and thus makes possible total cash accountability.

The present cash accountability feature can be incorporated as part of another vending control circuit such as those covered by the patents mentioned above and this can be done relatively easily and inexpensively. It can also be added to existing circuits at the factory or as a field addition with relatively little additional expense to the customer.

It is therefore a principal object of the present invention to provide relatively simple and inexpensive means to add cash accountability to new and to existing vending control circuits.

Another object of the invention is to make further use of certain existing circuits and circuit elements incorporated in vending control circuits to provide cash accountability capability.

Another object is to keep track of net sales on a continuing basis in a vending or like machine while optionally maintaining the total net sales figure confidential even from the route servicemen.

Another object is to reduce losses in vending and other coin controlled devices.

Another object is to provide better control over persons who service vending and like machines.

Another object is to make it possible to determine the net sales of a vending machine over any desired time period.

These and other objects and advantages of the present invention will become apparent after considering the following detailed specification which, in conjunction with the accompanying drawing, discloses and describes two different embodiments of the subject cash accountability means, and wherein.

Figure 1:
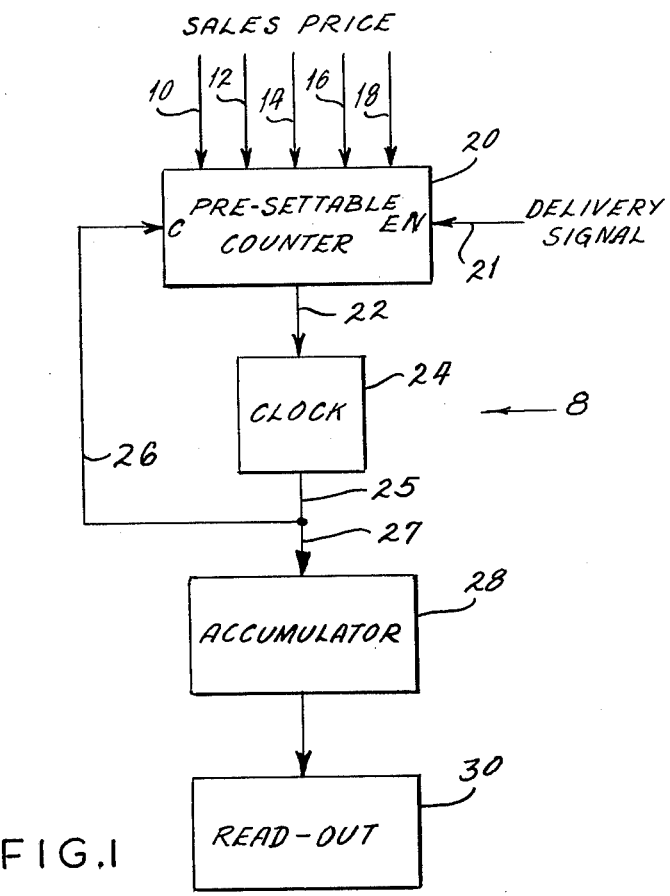
FIG. 1 is a simplified block diagram showing one form of the circuit for use in a vending or like machine to provide cash accountability capability.

Referring to the drawing more particularly by reference numbers, number 8 in FIG. 1 refers generally to a control circuit to provide cash accountability in a vending machine or like device, which circuit is constructed according to one form of the present invention. The circuit of FIG. 1 has a plurality of input leads 10, 12, 14, 16 and 18 labeled sales price which are shown connected to feed signals to a presettable counter circuit 20. The counter 20 may be a multistage binary counter, a shift or other type register, a ring counter or any other type counter or accumulator. The input signals which appear on leads 10–18 represent the sales price of an article to be vended. A signal on input lead 10 represents five cents, a signal on lead 12 ten cents, a signal on lead 14 twenty cents, a signal on lead 16 forty cents, and a signal on lead 18 eighty cents. The price of an article being vended will determine which of the input leads 10–18 have signals on them. For example, for a fifty cent vend price input signals will be present on the leads 12 and 16, while for a twenty-five cent vend price input signals will be present on the leads 10 and 14. The present circuit operates in conjunction with other vend control circuits, such as those disclosed in the patents mentioned above, and for the present circuit to operate vend price signals must occur on the leads 10–18 while simultaneously there must be a vend signal at another input 21. The signals that occur on the input 21 may be the same signals that are used to initiate or actuate a vend operation. The terminal of the counter 20 at which the input signals received on lead 21 are applied is labeled EN to indicate enable.

When vend price signals and a vend producing signal are simultaneously present on the input leads 10–18 and 21 and the vend price is entered in counter 20, the counter 20 will produce an output on output lead 22, and the signals on the lead 22 will energize or enable a clock circuit 24. The clock 24 may be an oscillator or any other suitable type clock circuit capable of producing a train of output clock pulses. The clock circuit 24, when enabled by a signal produced on the lead 22, produces output signals on lead 25. The clock pulses on the lead 25 are used for two purposes in the circuit of FIG. 1; first, as feedback signals on lead 26 to the C or count input of the counter 20, and, secondly, as inputs on input lead 27 to another accumulator circuit 28. The accumulator 28 accumulates the input signals it receives from the clock circuit 24 and has associated with it a readout device 30 where the total accumulation of the accumulator 28 is available. This total accumulation, as will be explained, represents the current total sales of the vending machine. Many different types of readout devices can be used for the device 30, including electronic readout devices, digital readout devices, or any other suitable readout device, such as those commonly used on calculators and the like. Where confidentiality is desired the readout device 30 can also be of a type that can only be read by special means coupled thereto, such as by a tape recorder or by a remote computer. The total sales of a plurality of vending machines can also be fed into a central computer system for processing.

The clock outputs on the lead 26 that are fed to the presettable counter 20 are entered subtractively therein relative to the vend price entered into the counter 20 from the leads 10-18, and these entries continue to be fed from the clock 24 until the counter 20 has counted back to zero count. When this occurs there will no longer be an output signal present on the output lead 22 because no longer will the conditions necessary to produce such a signal be present. Hence, the clock 24 will no longer be enabled to produce output pulses for feeding to the accumulator 28. This means that after the clock has counted a sufficient number of output pulses for entry into the counter 20 to cause the counter 20 to return to zero count the clock will be disabled. This means that the accumulator 28 will receive inputs corresponding to the vend or sales price of each article that is vended. However, these entries will not include total deposits because total deposits include amounts that are refunded or paid back and these amounts should not be reflected in total sales. The accumulator 28 will retain the amount entered into it for each vend and will have added into it the amount of each new vend that is made. This means that the accumulator 28 will maintain a running total of all sales and this amount will be available at the readout device 30. Anytime a supervisor or other person wants to find out what the total sales have been from a particular machines, he can find this out from the readout device 30 by looking at it or by obtaining the information in some other way. This enables accurate up-to-date sales information to be available at all times and for any desired time period. The advantages to having this information available are many, including especially for sales analysis and as a check on the honesty of persons servicing the vending machines. With the accumulator 28 maintaining a running total of sales and receiving its only inputs from the clock circuit 24, and with no means to reset the accumulator 28 or to make false entries, it is possible to maintain much better control over a vending operation.

Figure 2:
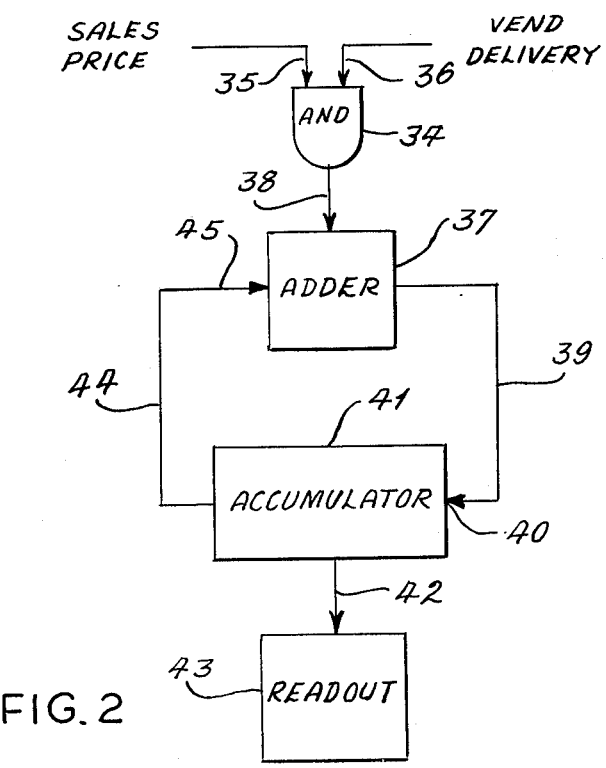
FIG. 2 is a block diagram showing another form of cash accountability control circuit for use on a vending or like machine.

FIG. 2 shows another form of cash accountability circuit which serves basically the same purposes as the circuit of FIG. 1 but has a somewhat different construction. The circuit of FIG. 2 includes an input AND gate 34 which has two input connections 35 and 36. The input connection 35 is labeled sales price and has a signal on it whenever a sales price is present in the sales price accumulator (not shown) in the vending machine. The other input on lead 36 to the AND gate 34 is labeled vend delivery, and a signal will be present on the lead 36 whenever a signal that initiates a vend operation is produced in the vending machine. This signal corresponds to the input signals on lead 21 in the circuit of FIG. 1. In order for the AND gate 34 to be satisfied so as to produce an output signal it is necessary for input signals to simultaneously be present on the input leads 35 and 36. When this condition occurs a signal is fed to the input of an adder circuit 37 on lead 38. The adder circuit 37 has an output which is connected by lead 39 to input 40 of an accumulator circuit 41. The accumulator circuit 41, like the accumulator circuit 28 in the FIG. 1 construction, includes storage register means for storing and maintaining therein a running accumulation representing total sales. The accumulator 41 has a first output which is connected by lead 42 to a readout device 43 which provides a continuous visual or other reading or indication of the total sales of the vending machine. The accumulator 41 also has a second output lead 44 which is connected to feedback input 45 of the adder circuit 37.

The sales or vend price is connected to be fed to the serial bit adder 37 by way of the AND gate 34. The vend price is available to the adder 37 whenever a vend delivery signal is present on the gate input lead 36. The output 44 of the accumulator 41 is connected to the input 45 of the adder 37 so that the old running total stored in the accumulator 41 can be increased by the sales price available to the adder circuit 37 on lead 38. The values appearing on leads 38 and 44 are added and the new adder circuit total resulting therefrom becomes a new running total which is reentered into the accumulator 41 on the lead 39. In other words, the sales price of each new article vended is added to the total previously entered in the accumulator 41 in the adder circuit 37 for reentry into the accumulator 41 so that after each vend operation is completed the amount remaining in the accumulation will equal the total sales.

The readout device 43 can be digital display, an entry on a magnetic tape, or other type readout entry, and the readout device can provide a readout that can be visually observed or read or entered only by a special pick-off device, such as a tape recorder or the like which is magnetically or electrically connected or coupled to the readout means. The total current sales information provided by the present device enables a vending machine firm to quickly and accurately obtain up-to-the-minute sales information which is useful for many purposes, including to determine the division of profits from a vending machine where the profits are to be divided between the vending machine company and the owner of the location where the vending machine is installed, the honesty of the person or persons who service the vending machines, and for other purposes as well.

The two different circuits described above are typical of many that could be used to provide the information indicated, and it is not intended to limit the scope of the invention to the particular embodiments disclosed. It should be emphasized, however, that the circuitry described herein is adaptable for use with many known and existing vending control circuits, including those disclosed and covered by the patents and applications identified above, and this can be done in most cases with relatively little additional equipment or circuitry being required and at relatively little expense. The subject means are also adaptable to be installed as original equipment or added as an addition to an existing vend control device.

Thus, there have been shown and described several embodiments of a unique cash accountability circuit which fulfill all of the objects and advantages sought therefor. It will be apparent to those skilled in the art, however, that many changes, variations, modifications and other uses and applications for the subject circuit are possible and contemplated, and all such changes, variations, modifications, and other uses and applications which do not depart from the spirit and scope of the invention are deemed to be covered by the invention which is limited only by the claims which follow.

What is claimed is:

1. Means to keep a running total of sales from a vending or like machine, which machine includes means to produce signal responses to represent the value of each article that is vended and other means to produce signals to cause vend operations to take place comprising a control circuit including first entry means having first and second input means, said first input means connected to receive signal responses representing the value of each article that is vended, said second input means connected to receive vend signals, said first entry means including means responsive to a vend signal to enter therein an amount to represent the price of such vend and other means responsive to the entry of an amount into said first entry means to produce an output therefrom, a clock responsive to said first entry means output to produce periodic pulses, said clock continuing to produce output pulses regardless of the status of said second input of said first entry means so long as the price amount entered into said first entry means exceeds the number of periodic pulses produced by said clock, accumulator means operatively connected to receive such periodic pulses, said accumulator means responsive to receipt of such periodic pulses to effect an increase in the amount stored therein, means to feed back the periodic pulses from the clock to said first entry means, said periodic pulses being entered in said first entry means in a way to combine with the signals entered therein from the vending machine until the first entry means has a predetermined entry therein, and means in said first entry means responsive to the occurrence of said predetermined entry condition therein to prevent the further production of said output therefrom.

2. The means defined in claim 1 wherein said first entry means includes a presettable counter and said first input means includes a plurality of input leads, said input leads connected to receive the signal responses representing the value of each article that is vended and to communicate such signal responses in a binary word format to said presettable counter.

3. The means defined in claim 2 wherein said presettable counter includes a plurality of serially connected bistable stages, each of said input leads being operatively connected to a respective bistable stage, said presettable counter connected to said second input means and responsive to receipt of a vend signal thereon to enter the binary word signal on said input leads into said bistable stages of said presettable counter.

4. The means defined in claim 3 wherein said first entry means produces an output therefrom whenever the entry therein is greater than zero.

5. The means defined in claim 3 wherein said presettable counter includes a decrement input connected to receive the periodic pulses fed back to the first entry means, said presettable counter responsive to receipt of said periodic pulses to decrement the entry therein.

6. Means to maintain a running total of sales from a vending or like machine which includes means to produce signal responses that represent the sale price of each article vended and a signal response to cause each vend operation to take place, comprising a first counter, a first input to said first counter and means operatively connecting said first input to the means in the vending machine for producing signal responses that represent the sale price, a second input to the first counter and means operatively connecting said second input to the means in the vending machine that produces a signal response that causes a vend operation to take place, a third input to said first counter, and an output therefrom, said first counter including means responsive to the presence of a vend signal on said second input simultaneously with the presence of sales price signal responses on the first input for entering into said first counter an amount corresponding to signal responses produced on said first input to represent the sale price of the article vended and other means responsive to the entry of such sale price to produce a signal response on the first counter output, a pulse generator having an input operatively connected to the output of the first counter and an output connected to said third input of the first counter, said pulse generator producing output pulses whenever a signal response is produced on the first counter output, said pulse generator continuing to produce output pulses therefrom regardless of the status of said second input of said first counter so long as the sale price amount entered into said first counter exceeds the number of pulse generator output pulses produced, a second counter having an input operatively connected to the output of the pulse generator to count output pulses produced by the pulse generator, said first counter including means responsive to pulse generator output pulses, said last named means inhibiting the further production of a signal response on said first counter output when the number of pulse generator output pulses equals the sale price entered into said first counter.

* * * * *